US006884762B2

(12) United States Patent
Breeden et al.

(10) Patent No.: US 6,884,762 B2
(45) Date of Patent: Apr. 26, 2005

(54) ESTER-CONTAINING DOWNHOLE DRILLING LUBRICATING COMPOSITION AND PROCESSES THEREFOR AND THEREWITH

(75) Inventors: David L. Breeden, Missouri City, TX (US); Robert L. Meyer, Houston, TX (US)

(73) Assignee: Newpark Drilling Fluids, L.L.C., Houston, TX (US)

( * ) Notice: Subject to any disclaimer, the term of this patent is extended or adjusted under 35 U.S.C. 154(b) by 0 days.

(21) Appl. No.: 10/281,559

(22) Filed: Oct. 28, 2002

(65) Prior Publication Data

US 2004/0082487 A1 Apr. 29, 2004

(51) Int. Cl.[7] ................... C10M 129/74; C10M 159/12; C09K 7/06
(52) U.S. Cl. ........................ 508/486; 507/110; 507/116
(58) Field of Search .......................... 508/486; 507/110, 507/116

(56) References Cited

U.S. PATENT DOCUMENTS

| | | | | |
|---|---|---|---|---|
| 3,047,493 A | * | 7/1962 | Rosenberg | .................. 507/107 |
| 3,637,774 A | * | 1/1972 | Babayan et al. | ............ 521/172 |
| 4,268,400 A | | 5/1981 | Lucas et al. | |
| 4,288,582 A | | 9/1981 | Lucas et al. | |
| 4,293,427 A | | 10/1981 | Lucas et al. | |
| 4,309,324 A | | 1/1982 | Yuasa et al. | |
| 4,683,069 A | * | 7/1987 | Brewster et al. | ............ 508/378 |
| 4,795,581 A | | 1/1989 | Nieh et al. | |
| 4,812,248 A | * | 3/1989 | Marwick | ..................... 508/486 |
| 4,830,765 A | | 5/1989 | Perricone et al. | |
| 4,941,981 A | | 7/1990 | Perricone et al. | |
| 4,963,273 A | | 10/1990 | Perricone et al. | |
| 5,007,489 A | | 4/1991 | Enright et al. | |
| 5,032,295 A | | 7/1991 | Matz et al. | |
| 5,072,794 A | | 12/1991 | Hale et al. | |
| 5,099,930 A | | 3/1992 | Enright et al. | |
| 5,114,603 A | * | 5/1992 | Kennedy et al. | ............ 508/486 |
| 5,120,708 A | | 6/1992 | Melear et al. | |
| 5,198,415 A | | 3/1993 | Steiger | |
| 5,244,878 A | | 9/1993 | Sugier et al. | |
| 5,260,268 A | | 11/1993 | Forsberg et al. | |
| 5,344,817 A | | 9/1994 | Hayes et al. | |
| 5,380,469 A | * | 1/1995 | Flider | ......................... 508/486 |
| 5,436,227 A | | 7/1995 | Hale et al. | |
| 5,466,719 A | * | 11/1995 | Jakobson et al. | ............ 514/785 |
| 5,535,834 A | | 7/1996 | Naraghi et al. | |
| 5,586,608 A | | 12/1996 | Clark et al. | |
| 5,605,879 A | | 2/1997 | Halliday et al. | |
| 5,618,780 A | * | 4/1997 | Argillier et al. | ............. 508/488 |
| 5,641,740 A | * | 6/1997 | Debska-Chwaja | ........... 508/486 |
| 5,658,860 A | | 8/1997 | Clark et al. | |
| 5,686,396 A | * | 11/1997 | Hale et al. | ................... 507/136 |
| 5,715,896 A | | 2/1998 | Naraghi | |
| 5,807,811 A | * | 9/1998 | Malchow, Jr. | ............... 507/128 |
| 5,851,958 A | | 12/1998 | Halliday et al. | |
| 5,869,434 A | | 2/1999 | Mueller et al. | |
| 6,022,833 A | | 2/2000 | Mueller et al. | |
| 6,339,165 B1 | | 1/2002 | Endo et al. | |
| 6,402,983 B1 | * | 6/2002 | Abe et al. | ...................... 252/77 |

OTHER PUBLICATIONS

U.S. SIR No. H1000 (Patel, et al.), Filed Aug. 16, 1990, Published Dec. 3, 1991.
U.S. SIR No. H1611 (Patel), Filed Nov. 4, 1993, Published Nov. 5, 1996.

* cited by examiner

*Primary Examiner*—Ellen M McAvoy
(74) *Attorney, Agent, or Firm*—Roy F. House

(57) ABSTRACT

A lubricating composition containing one or more esters obtained as a reaction product from a reaction mixture of a glycerol component, a fatty acid component, and a carboxylic acid component wherein said glycerol component comprises glycerol, glycerol oligomers, or combinations thereof and further wherein said glycerol oligomers comprise linear chains, branched chains, cyclic chains, or combinations thereof and further wherein said glycerol oligomers have at least 2 repeat glycerol units and further no more than about 32 repeat glycerol units; wherein said fatty acid component comprises alkyl groups having at least about 8 carbon atoms and further wherein said alkyl groups have no more than about 32 carbon atoms; wherein said carboxylic component has at least one carbon atom per molecule and no more than about 8 carbon atoms per molecule; and wherein the fatty acid component comprises at least 50 percent by weight of the fatty acid component of oleic acid; wherein the fatty acid component comprises at least 5 percent by weight of the reaction mixture; and no more than about 40% by weight of the reaction mixture; and wherein the carboxylic acid component comprises at least about 0.1% by weight of the reaction mixture and no more than 20% of the reaction mixture. The lubricating composition can additionally contain a water-insoluble fluid. The lubricating composition is suitable for use as a lubricant and rate of penetration enhancing additive in drilling muds for oil well drilling operations.

44 Claims, No Drawings

ESTER-CONTAINING DOWNHOLE DRILLING LUBRICATING COMPOSITION AND PROCESSES THEREFOR AND THEREWITH

BACKGROUND OF THE INVENTION

The present invention relates to an ester-containing lubricating composition and processes therefor and therewith, such as use in downhole drilling operations.

The art of boring into the earth with a drill string, particularly for oil and gas production, typically involves rotating a toolhead bit fastened to the end of a string of drill pipe with the string being driven by a surface engine. A fluid called a "drilling mud" is injected into the hole at the point of the bit by circulating the drilling mud down the inner space of the string through openings in the bit and up through the annular space of the well. The main purposes of the drilling mud are to clean the bit, take up debris from the well, and stabilize the formation walls in contact with the drilling mud. An additional important aspect of the drilling mud is to lubricate the drill bit to prevent drill-pipe sticking for which various types of lubricating agents have been incorporated into the drilling mud. There is a significant and continuing need for a lubricating composition that has good handling characteristics, can be readily mixed with new or existing drilling fluids, has a relatively low cost and toxicity, and helps improve the lubricity of the drilling fluid or similar fluid that is mixed with or contains such lubricating composition. In addition, a lubricating composition that comprises components that can be obtained from by-products of manufacturing processes that provide a use for such by-products other than disposal would also be a significant contribution to the art and to the economy.

SUMMARY OF THE INVENTION

An ester-containing lubricating composition is provided that enhances the lubricity of a drilling mud to prevent drilling string sticking and improve the rate of penetration. An ester-containing lubricating composition of the present invention can be made from components that can be waste products or by-products from manufacturing processes and thus, are very inexpensive to use and present an environmentally friendly disposal alternative to incineration or burning. An ester-containing lubricating composition of the present invention is generally nontoxic to marine life, environmentally acceptable, easy to prepare, and capable of being disposed of at the drill site without costly disposal procedures.

An embodiment the present invention comprises a lubricating composition suitable for use in downhole drilling operations in a drilling mud for lubricating the drill string. The lubricating composition comprises one or more esters obtained as a reaction product of a reaction mixture comprising: a) a glycerol component comprising glycerol, glycerol oligomers, or combinations thereof; b) a fatty acid component; and, c) a carboxylic acid component, wherein the reaction product is neutralized with a neutralizing agent. The glycerol component can comprise glycerol oligomers having linear chains, branched chains, cyclic chains, or combinations thereof and predominantly at least 2 and no more than about 32 glycerol repeat units. The fatty acid component can comprise a mixture of fatty acids having both linear and branched, saturated and unsaturated, alkyl groups from at least about 8 to no more than about 32 carbon atoms in length predominantly, although other fatty acids are suitable. The carboxylic acid component generally has at least one carbon atom per molecule and no more than about 12 carbon atoms per molecule. In the practice of a process of the present invention, the glycerol component and the fatty acid component can be obtained as by-products in respective manufacturing processes that are heretofore disposed of as waste products. Applicants have discovered that these by-products can be reacted, preferably along with a carboxylic acid component, to produce an ester-containing lubricating composition which, when employed at a suitable concentration in a drilling mud in drilling operations, can be used to lubricate the bit for enhanced rate of penetration, stabilize shale formations, reduce bit sticking, and minimize water loss into the formation. A lubricating composition of the present invention can additionally comprise a water-insoluble fluid selected from the group consisting of synthetic fluids, mineral oils, diesel, aliphatic compounds, vegetable oils, glycols, and the like and combinations thereof.

In another embodiment, the present invention comprises a method for lubricating a downhole well drilling operation comprising the steps of: contacting, preferably by mixing, an ester-containing lubricating composition of the present invention with a drilling fluid to provide a drilling mud, and then circulating such drilling mud through the well.

An ester-containing lubricating composition of the present invention comprises one or more esters which can be prepared as a reaction product of a reaction mixture of a glycerol component, a fatty acid component, and a carboxylic acid component. The reaction is catalyzed by any suitable catalyzing agent capable of catalyzing an esterification reaction as described herein, such as a concentrated acid. The resulting product can then be neutralized with a neutralizing agent to a pH of at least about 1 and no more than about 10. The glycerol component can comprise glycerol oligomers having linear chains, branched chains, cyclic chains, or combinations thereof and predominantly at least 2 and no more than about 32 glycerol repeat units. The fatty acid component can comprise a mixture of fatty acids having both linear and branched, saturated and unsaturated, alkyl groups from at least about 8 to no more than about 32 carbon atoms in length predominantly, although other fatty acids are suitable. The carboxylic acid component generally has at least one carbon atom per molecule and no more than about 12 carbon atoms per molecule. The drilling mud generally comprises an ester-containing lubricating composition of the present invention in an amount of at least about 0.1 percent by volume based on the total volume of the drilling mud and ester-containing lubricating composition, preferably at least about 1 percent by volume. The drilling mud generally comprises an ester-containing lubricating composition of the present invention in an amount of no more than about 25 percent by volume based on the total volume of the drilling mud and ester-containing lubricating composition, preferably no more than about 10 percent by volume.

Other objects and advantages of the present invention will become apparent from the detailed description of the invention and the appended claims.

DETAILED DESCRIPTION OF THE INVENTION

An ester-containing lubricating composition is provided which is-generally nontoxic to marine life and is acceptable to water environments, particularly the coastal waters around off-shore drilling operations. In another embodiment of the present invention, a drilling mud containing such ester-containing lubricating composition enhances the lubricity of drilling operations and improves the rate of penetration and shale stabilization. Furthermore, an ester-containing lubricating composition of the present invention is easy to prepare and cost effective to use.

An ester-containing lubricating composition of the present invention comprises a lubricating composition which comprises one or more esters prepared as the reaction product of a reaction mixture comprising a glycerol component, a fatty acid component, and a carboxylic acid component. The reaction is generally catalyzed by any suitable catalyzing agent capable of catalyzing an esterification reaction to provide an ester-containing reaction product as described herein.

Following a suitable reaction extent, an ester-containing reaction product is obtained which is preferably neutralized to a pH of at least about 1 and no more than about 10. Such neutralizing is preferably conducted by using any neutralizing agent capable of providing a neutralized ester-containing reaction product as described herein. Examples of suitable neutralizing agents include, but are not limited to, potassium hydroxide, ammonium hydroxide, sodium hydroxide, and the like and combinations thereof, preferably potassium hydroxide or ammonium hydroxide, more preferably potassium hydroxide. Once prepared, an ester-containing lubricating composition of the present invention is contacted with, preferably is mixed into, a suitably prepared downhole fluid to provide a drilling mud for circulation through a well by any means known in the art.

An ester-containing lubricating composition of the present invention can additionally comprise a water-insoluble fluid selected from the group consisting of synthetic fluids, mineral oils, diesel, aliphatic compounds, vegetable oils, glycols, and the like and combinations thereof. When a water-insoluble fluid is present in addition to a neutralized ester-containing reaction product, the ester-containing lubricating composition generally comprises a water-insoluble fluid in an amount of at least about 0.01 percent by weight based on the total weight of the ester-containing lubricating composition, preferably at least about 0.5 percent by weight, and more preferably at least about 1 percent by weight. When a water-insoluble fluid is present in addition to a neutralized ester-containing reaction product, the ester-containing lubricating composition generally comprises a water-insoluble fluid in an amount of no more than about 39 percent by weight based on the total weight of the ester-containing lubricating composition, preferably no more than about 35 percent by weight, and more preferably no more than about 32 percent by weight.

The first component of the reaction mixture is a glycerol component comprising glycerol, glycerol oligomers, or combinations thereof. The glycerol component may be obtained as a by-product from a manufacturing process such as a synthetic glycerine manufacturing process or purification of crude glycerine from natural sources. An average composition of such by-product can be found herein in Table I. The glycerol oligomers generally have at least 2 glycerol repeat units. The glycerol oligomers generally have no more than about 32 glycerol repeat units, preferably no more than about 20 glycerol repeat units, and more preferably no more than about 10 glycerol repeat units. The glycerol oligomers can have linear chain lengths, branched chain lengths, cyclic chain lengths, or combinations thereof as known in the art. When a glycerol component of the present invention comprises one or more glycerol oligomers, the glycerol component can be referred to as a polyglycerol or polyglycerol component.

In making the present ester-containing product, the glycerol component generally comprises at least about 25 percent by weight of the reaction mixture comprising a glycerol component, a fatty acid component, and a carboxylic acid component, preferably at least about 50 percent by weight of the reaction mixture, and more preferably at least about 60 percent by weight of the reaction mixture. In making the present ester-containing product, the glycerol component generally comprises no more than about 90 percent by weight of the reaction mixture comprising a glycerol component, a fatty acid component, and a carboxylic acid component, preferably no more than about 75 percent by weight of the reaction mixture, and more preferably no more than about 70 percent by weight of the reaction mixture.

TABLE I

Glycerol Component Composition

| Component | Weight Percent | Molecular Weight | OH Functionality |
|---|---|---|---|
| Glycerine | 10–13 | 92 | 3 |
| Diglycerine | 16–23 | 166 | 2–4 |
| Triglycerine | 5–7 | 240 | 2–6 |
| Tetraglycerine | 4–6 | 314 | 2–8 |
| Pentaglycerine | 3–4 | 388 | 2–10 |
| Heavier polyglycerines | ~15 | 466+ | 2+ |
| NaCl | 2–4 | — | — |
| $Na_2CO_3$ | 0.3–1 | — | — |
| Water | 22–28 | — | — |
| Sodium salt of an organic acid | 11–14 | — | — |

The fatty acid component, of the reaction mixture comprising a glycerol component, a fatty acid component, and a carboxylic acid component, can be any fatty acid which is effective in providing a lubricating composition as described herein. The fatty acids suitable for use in the present invention can be linear or branched, saturated or unsaturated. The fatty acids suitable for use in the present invention generally have at least about 8 carbon atoms in the alkyl group, preferably at least about 10 carbon atoms in the alkyl group, and more preferably at least about 12 carbon atoms in the alkyl group. The fatty acids suitable for use in the present invention generally have no more than about 32 carbon atoms in the alkyl group, preferably no more than about 24 carbon atoms in the alkyl group, and more preferably no more than about 18 carbon atoms in the alkyl group. Examples of suitable fatty acids include, but are not limited to, lauric acid, oleic acid, stearic acid, linoleic acid, linolenic acid, and the like and combinations thereof.

Generally, the fatty acid component can be obtained from, for example, the manufacture of vegetable oils, from wood pulp processing, from animal fats processing, and the like. The fatty acid component can be obtained from any manufacturer of fatty acids and like products. The fatty acid component generally has an acid value of at least about 10 mg KOH/g, preferably at least about 20 mg KOH/g, and more preferably at least about 30 mg KOH/g. The fatty acid component generally has an acid value of no more than about 90 mg KOH/g, preferably no more than about 80 mg KOH/g, and more preferably no more than about 70 mg KOH/g. In addition, iodine values are generally at least about 30, preferably at least about 40, and generally no more than about 100, preferably no more than about 90. The titer temperatures are generally at least about −10° C., preferably at least about −5° C., and generally no more than about 25° C., preferably no more than about 20° C. Such characterization tests are well known in the art.

A preferred fatty acid component comprises primarily oleic acid in an amount of at least about 50 percent by weight of the fatty acid component and no more than about 70 percent by weight of the fatty acid component.

The fatty acid component generally comprises at least about 5 percent by weight of the reaction mixture comprising a glycerol component, a fatty acid component, and a carboxylic acid component, and generally no more than about 40 percent by weight of the reaction mixture comprising a glycerol component, a fatty acid component, and a carboxylic acid component, preferably no more than about 30 percent by weight of the reaction mixture, and more preferably no more than about 20 percent by weight of the reaction mixture.

The carboxylic acid component of the reaction mixture can be any carboxylic acid(s) capable of providing for an ester-containing lubricating composition as described herein. The carboxylic acid component generally has at least 1 carbon atom per molecule, preferably at least 2 carbon atoms per molecule. The carboxylic acid component generally has no more than about 12 carbon atoms per molecule, preferably no more than about 10 carbon atoms per molecule, and more preferably no more than about 8 carbon atoms per molecule. Examples of a suitable carboxylic acid include, but are not limited to, formic acid, acetic acid, propionic acid, and the like and combinations thereof. Preferably, the carboxylic acid component is acetic acid, more preferably, glacial acetic acid.

The carboxylic acid component helps promote the reaction of the glycerol component and the fatty acid component by creating carboxylic ester intermediates. However, the carboxylic acid component may not be required, if the reaction of the glycerol component and the fatty acid component can be promoted by some other means, such as by changing the catalyst or by changing the reaction parameters such as the temperature, pressure and the like. When a carboxylic acid component is not present, the reaction mixture, comprising a glycerol component and a fatty acid component as described herein, may be catalyzed with a catalyzing agent as described herein and neutralized with a neutralizing agent as described herein to provide for a neutralized ester-containing reaction product. The neutralized ester-containing reaction product can be contacted with a water-insoluble fluid as described herein to provide for a lubricating composition of the present invention.

The carboxylic acid component generally comprises at least about 0.1 percent by weight of the reaction mixture comprising a glycerol component, a fatty acid component, and a carboxylic acid component, preferably at least about 5 percent by weight of the reaction mixture, and more preferably at least about 7 percent by weight of the reaction mixture. The carboxylic acid component generally comprises no more than about 20 percent by weight of the reaction mixture comprising a glycerol component, a fatty acid component, and a carboxylic acid component, preferably no more than about 15 percent by weight of the reaction mixture, and more preferably no more than about 12 percent by weight of the reaction mixture.

An ester-containing lubricating composition of the present invention can be made by any continuous or batch process known in the art. Typically, in the batch process, the glycerol component and fatty acid component are charged together and heated to a reaction temperature described herein, preferably in an atmosphere of nitrogen. The carboxylic acid component, preferably acetic acid, more preferably glacial acetic acid, is then added followed by the addition of a catalyzing agent capable of catalyzing an esterification reaction to provide an ester-containing reaction product as described herein. Examples of suitable catalyzing agents include, but are not limited to, sulfuric acid, hydrochloric acid, nitric acid, p-toluene sulfonic acid, organic sulfonic acids, and the like and combinations thereof. A preferred catalyzing agent is concentrated sulfuric acid ($H_2SO_4$).

The catalyzing agent, preferably concentrated sulfuric acid, generally comprises at least about 0.1 percent by weight of the reaction mixture comprising a glycerol component, a fatty acid component, and a carboxylic acid component and generally no more than about 5 percent by weight of the reaction mixture, preferably no more than about 3 percent by weight of the reaction mixture, and more preferably no more than about 1 percent by weight of the reaction mixture. The reaction can be allowed to proceed until a partial or substantially complete degree of esterification has been obtained. The present ester-containing reaction product can contain a ratio of ester linkages to free carboxyl functionability, i.e., a ratio of ester to free acid, of generally about 100:1 (ester:acid) to about 1:100 (ester:acid), preferably about 50:1 (ester:acid) to about 1:50 (ester:acid).

The reaction temperature during esterification can be any temperature capable of providing for the esterification described herein. The reaction temperature before the addition of a catalyzing agent as described herein is generally at least about 50° F., preferably at least about 70° F. The reaction temperature before the addition of a catalyzing agent as described herein is generally no more than about 600° F., preferably no more than about 500° F. Preferably, the temperature is stable before the addition of the catalyzing agent. After the addition of the catalyzing agent, the acid number (AN) is generally at least about 50 and generally no more than about 300, preferably no more than about 200. After the addition of the catalyzing agent, the reaction preferably proceeds to completion with a total acid value (TAV) of generally no more than about 20, preferably no more than about 10.

The reaction temperature after the addition of the catalyzing agent is generally at least about 100° F., preferably at least about 150° F. The reaction temperature after the addition of the catalyzing agent is generally no more than about 600° F., preferably no more than about 500° F. Any suitable means known in the art can be used to maintain the reaction temperature such as a heat exchanger. The reaction pressure during esterification can be any pressure capable of providing for the esterification described herein. The reaction pressure during esterification is generally at least about atmospheric and no more than about 100 pounds per square inch absolute (psia), preferably about atmospheric.

Preferably, after the reaction has proceeded to the extent that one or more esters have been produced, the reaction mixture is neutralized with any neutralizing agent which is capable of providing a reaction mixture having a pH of generally at least about 1 and generally no more than about 10. Examples of suitable neutralizing agents include, but are not limited to, potassium hydroxide, ammonium hydroxide, sodium hydroxide, and the like and combinations thereof. Preferably the neutralizing agent is potassium hydroxide. The neutralizing agent can be added in any amount(s) which provides for a neutralized esters containing reaction product having a pH of generally at least about 1, preferably at least about 5, more preferably at least about 7, and generally no more than about 10, preferably no more than about 9. The reaction temperature during the neutralizing as described herein is generally at least about 50° F., preferably at least about 75° F. The reaction temperature during the neutralizing as described herein is generally no more than about 225° F., preferably no more than about 200° F.

In a preferred process of preparing an ester-containing lubricating composition of the present invention, after the addition of a catalyzing agent as described herein, water vapor evolves, is condensed, and collected. The weight of such condensate can be used to calculate a suitable amount of neutralizing agent as described herein to add to the reaction mixture. Such calculations are based on dividing the acid number by 450 and multiplying by the condensate weight as known in the art. In addition, after the rate of water evolution has significantly decreased compared to the initial rate of water evolution, typically when water evolution has almost stopped, the reaction mixture is preferably heated to obtain a reaction temperature as described herein and to obtain a reaction(mixture having an acid number as described herein of at least about 2, preferably at least about 5, and generally no more than about 20, preferably no more than about 10. The neutralizing agent(s) can be added directly to the reaction mixture, or additionally or alternatively, the neutralizing agent(s) can be added to the condensate collected which is then added to the reaction mixture.

The neutralized ester-containing reaction product generally has a specific gravity at 77° F. of at least about 1.10, preferably at least about 1.20, and more preferably at least about 1.25, and generally no more than about 1.50, preferably no more than about 1.40, and more preferably no more than about 1.30. The neutralized ester-containing reaction product generally has a solids percentage of at least about 60 and no more than about 90, preferably about 85.

In addition, an ester-containing lubricating composition of the present invention can additionally comprise a water-insoluble fluid selected from the group consisting of synthetic fluids, mineral oils, diesel, aliphatic compounds, vegetable oils, glycols, and the like and combinations thereof. When a water-insoluble fluid is present in addition to a neutralized ester-containing reaction product, the lubricating composition generally comprises a water-insoluble fluid in an amount of at least about 0.01 percent by weight based on the total weight of the lubricating composition and water-insoluble fluid, preferably at least about 0.5 percent by weight, and more preferably at least about 1 percent by weight. When a water-insoluble fluid is present in addition to a neutralized ester-containing reaction product, the lubricating composition generally comprises a water-insoluble fluid in an amount of no more than about 39 percent by weight based on the total weight of the lubricating composition and water-insoluble fluid, preferably no more than about 35 percent by weight, and more preferably no more than about 32 percent by weight.

An example water-insoluble fluid is a mixture of internal olefins of 13 to 20 carbon atoms per molecule, mainly 16 to 18 carbon atoms per molecule.

Another example water-insoluble fluid is a mixture of linear alpha olefins of 14 carbon atoms per molecule.

Another example water-insoluble fluid comprises a mixture of dimers of linear olefins of 12 carbon atoms per molecule, i.e., a C12 dimer polyalphaolefin. The C12 dimer polyalphaolefin provides for lower toxicity, higher lubricity, higher molecular weight, and higher viscosity compared to the other two example water-insoluble fluids described herein.

For example, a neutralized ester-containing reaction product of the present invention, having a specific gravity at 77° F. of about 1.28, can be blended with a synthetic fluid product obtained from Shrieve Chemical Company, Woodlands, Texas comprising a mixture of internal olefins of 13 to 20 carbon atoms per molecule, mainly 16 to 18 carbon atoms per molecule, and having a specific gravity at 77° F. of about 0.76, in a volume ratio of reaction product to synthetic fluid product of about 70:30 (weight ratio of about 80:20) to provide an ester-containing lubricating composition of the present invention.

An ester-containing lubricating composition of the present invention, which can be provided in large quantities and stored in drums, totes, and the like, can be added to various downhole fluids as described herein at, for example, the point of production of such various downhole fluids or, preferably, added at the well site.

In addition, an ester-containing lubricating composition of the present invention can be subjected to cross-linking with any cross-linking agent effective in cross-linking an ester-containing lubricating composition of the present invention. Examples of suitable crosslinking agents include, but are not limited to, diacids, such as maleic, formic, succinic, glutaric, and the like and combinations thereof, and anhydrides thereof and combinations thereof, acid halides thereof, and the like and combinations thereof. Similar type diacids may also be used.

When an ester-containing lubricating composition of the present invention is subjected to cross-linking by any means known in the art for cross-linking an ester-containing lubricating composition, the extent of such cross-linking is generally at least about 0.01 percent and preferably at least about 0.1 percent. The extent of such cross-linking is generally no more than about 15 percent, preferably no more than about 10 percent.

In another embodiment of the present invention, a drilling mud comprising an ester-containing lubricating composition of the present invention is provided. The ester-containing lubricating composition can be present in a drilling mud generally in an amount of at least about 0.1 percent by volume based on the total volume of the drilling mud comprising an ester-containing lubricating composition, preferably at least about 1 percent by volume, and more preferably at least about 3 percent by volume. The ester-containing lubricating composition can be present in a drilling mud generally in an amount of no more than about 25 percent by volume based on the total volume of the drilling mud comprising an ester-containing lubricating composition, preferably no more than about 10 percent by volume, and more preferably no more than about 8 percent by volume.

An ester-containing lubricating composition of the present invention can be contacted with a downhole fluid by any method known in the art, preferably by mixing, to provide a drilling mud comprising such ester-containing lubricating composition. The drilling mud can then be circulated in the wellbore during drilling. The initial downhole fluid to be contacted with an ester-containing lubricating composition of the present invention to provide a drilling mud as described herein can be any downhole fluid known in the art. Examples of suitable downhole fluids include, but are not limited to, drilling fluids, drill-in fluids, completion fluids, and the like and combinations thereof.

The following examples are presented to further illustrate the present invention and are not to be construed as unduly limiting the scope of the present invention.

EXAMPLE I

A lubricating composition comprising an ester was made by a batch reaction as follows. Into a reaction vessel equipped with a heating mantle, a nitrogen pad, a stirring paddle, and a condensing column, 66.4 pounds of a glycerol-based reactant (having the characteristics as described herein in Table I) and 7.04 pounds of a fatty acids-based reactant (having the characteristics of the fatty acid component as described herein) were charged. The mixture was then heated to 220° F. under a nitrogen pad and mixed for one hour.

Next, 10.34 pounds of glacial acetic acid were charged and mixed into the vessel. The temperature was increased to 250° F. Upon temperature stabilization, 3.82 pounds of sulfuric acid (93% by weight) were added and additional heat was applied to carefully bring the reaction temperature to 300° F. The reaction mixture was analyzed for acid number (AN) and total acid value (TAV). The AN was above 100 and the TAV was less than 5.

As the reaction progressed, water vapor was evolved, condensed, and collected for later weighing and AN analysis. When water evolution ceased, the reaction mixture was heated to 350° F. until the AN analysis of the reaction mixture was in a range of from 5 to 10. The product made was then cooled and the nitrogen blanket was removed. Condensate collected was weighed and analyzed for AN.

A potassium hydroxide solution was then added to the collected condensate in an amount (calculated as AN/450× condensate weight) of 8 pounds of 45% by weight KOH solution. The neutralized condensate was then added to the reaction product. An additional potassium hydroxide solution was then added to the reaction product containing the neutralized condensate in an amount (calculated using the reaction product containing the neutralized condensate as AN/450×current batch weight) of 2.4 pounds of 45% by weight KOH solution which was added when the temperature was below 200° F.

When the temperature of the reaction product had cooled to below about 140° F., a 45% by weight KOH solution was added until the pH of a 5% solution of the reaction product in water reached a pH of about 8.5. The neutralized ester-containing product had a specific gravity of about 1.27 at 77° F. and a solids percentage of 85.

EXAMPLE II

Compositions A and B were commercially available, commonly used lubricants of proprietary composition for use in drilling fluids.

Composition C was a lubricating composition comprising a 70:30 volume mixture of the neutralized ester-containing product of Example I and a synthetic fluid product obtained from Shrieve Chemical Company, Woodlands, Texas comprising a mixture of internal olefins of 13 to 20 carbon atoms per molecule, mainly 16 to 18 carbon atoms per molecule. Composition C was prepared by mixing the neutralized ester-containing product of Example I with the synthetic fluid product at a temperature of about 70° F. and atmospheric pressure to obtain a 70:30 volume mixture of neutralized ester-containing product to synthetic fluid product (weight ratio of neutralized ester-containing product to synthetic fluid product was about 80:20).

Compositions A, B, and C were then each added to various base fluids as disclosed herein in Table II including Fresh Water, Sea Water, Saturated Sodium Chloride Brine, 10 pounds per barrel of American Petroleum Institute (API) grade bentonite in fresh water (denoted as 10 ppb Gel Slurry), and 20 pounds per barrel of American Petroleum Institute (API) grade bentonite in fresh water (denoted as 20 ppb Gel Slurry) in amounts to provide for 1 volume percent, 3 volume percent, and 5 volume percent mixtures of Compositions A, B, and C, respectively in the various base fluids.

Lubricity tests were conducted on the 1, 3, and 5 volume percent mixtures of Compositions A, B, and C, respectively, in the various base fluids using an OFI Testing Equipment Digital EP (Extreme Pressure) and Lubricity Tester according to the manufacturer's procedures. The results of the lubricity tests are disclosed herein in Table II indicating the percent reduction in lubricity coefficient compared to each base fluid that did not contain Compositions A, B, or C.

TABLE II

Lubricity Tests
(% Reduction from Base Fluid)

| | 1 volume % mixture | 3 volume % mixture | 5 volume % mixture |
|---|---|---|---|
| Fresh Water | | | |
| A | 35.6 | 39.2 | 42.0 |
| B | 35.6 | 63.2 | 60.6 |
| C | 43.6 | 55.9 | 61.4 |
| Sea Water | | | |
| A | 41.8 | 30.1 | 28.2 |
| B | 45.6 | 39.0 | 39.4 |
| C | 42.8 | 49.0 | 54.8 |
| Saturated Sodium Chloride Brine | | | |
| A | 26.5 | 27.4 | 29.2 |
| B | 19.2 | 30.5 | 33.7 |
| C | 31.4 | 35.5 | 41.4 |
| 10 ppb Gel Slurry | | | |
| A | 25.3 | 26.0 | 25.4 |
| B | 38.9 | 39.1 | 44.5 |
| C | 40.5 | 42.2 | 49.4 |
| 20 ppb Gel Slurry | | | |
| A | 18.9 | 20.8 | 21.5 |
| B | 26.9 | 28.3 | 40.1 |
| C | 24.5 | 31.4 | 43.5 |

The results shown in the above examples clearly demonstrate that the present invention is well adapted to carry out the objects and attain the ends and advantages mentioned as well as those inherent therein.

Reasonable variations, modifications, and adaptations can be made within the scope of the disclosure and the appended claims without departing from the scope of this invention.

What is claimed is:

1. A lubricating composition comprising one or more esters obtained as a reaction product of a reaction mixture comprising:
   a. a glycerol component, wherein said glycerol component comprises glycerol, glycerol oligomers, or combinations thereof and further wherein said glycerol oligomers comprise linear chains, branched chains, cyclic chains, or combinations thereof and further wherein said glycerol oligomers have at least 2 repeat glycerol units and further no more than about 32 repeat glycerol units;
   b. a fatty acid component comprising alkyl groups having at least about 8 carbon atoms and further wherein said alkyl groups have no more than about 32 carbon atoms; and
   c. a carboxylic acid component, wherein said carboxylic acid component has at least one carbon atom per molecule and no more than about 8 carbon atoms per molecule;

wherein the fatty acid component comprises at least 50 percent by weight of the fatty acid component of oleic acid; wherein the fatty acid component comprises at least 5 percent by weight of the reaction mixture; and no more than about 40% by weight of the reaction mixture; and wherein the carboxylic acid component comprises at least about 0.1% by weight of the reaction mixture and no more than 20% of the reaction mixture.

2. The composition of claim 1, further comprising a water-insoluble fluid, wherein said water-insoluble fluid is present in an amount of at least 0.01 percent by weight of the composition, and further wherein said water-insoluble fluid is present in an amount of no more than about 39 percent by weight of the composition, and further wherein said water-insoluble fluid is selected from the group consisting of synthetic fluids, mineral oils, diesel, aliphatic compounds, vegetable oils, glycols, and combinations thereof.

3. The composition of claim 1, wherein said reaction mixture is catalyzed, with a catalyzing agent selected from the group consisting of sulfuric acid, hydrochloric acid, nitric acid, p-toluene sulfonic acid, organic sulfonic acids, and combinations thereof, and neutralized, with a neutralizing agent selected from the group consisting of potassium hydroxide, ammonium hydroxide, sodium hydroxide, and combinations thereof.

4. The composition of claim 1, crosslinked from at least about 0.01 percent, and crosslinked to no more than about 15 percent, with a crosslinking agent selected from the group consisting of diacids, anhydrides thereof, acid halides thereof, and combinations thereof.

5. The composition of claim 1, wherein said glycerol component comprises at least about 25 percent by weight of said reaction mixture, and further wherein said glycerol component comprises no more than about 90 percent by weight of said reaction mixture.

6. The composition of claim 5, further comprising a water-insoluble fluid, wherein said water-insoluble fluid is present in an amount of at least about 0.01 percent by weight of said composition and further wherein said water-insoluble fluid is present in an amount of no more than about 39 percent by weight of said composition, and further wherein said water-insoluble fluid is selected from the group consisting of synthetic fluids, mineral oils, diesel, aliphatic compounds, vegetable oils, glycols, and combinations thereof.

7. The composition of claim 5, wherein said reaction mixture is catalyzed, with a catalyzing agent selected from the group consisting of sulfuric acid, hydrochloric acid, nitric acid, p-toluene sulfonic acid, organic sulfonic acids, and combinations thereof, and neutralized, with a neutralizing agent selected from the group consisting of potassium hydroxide, ammonium hydroxide, sodium hydroxide, and combinations thereof.

8. The composition of claim 5, crosslinked from at least about 0.01 percent, and crosslinked to no more than about 15 percent, with a crosslinking agent selected from the group consisting of diacids, anhydrides thereof, acid halides thereof and combinations thereof.

9. The composition of claim 1, wherein a ratio of ester to free acid in said reaction product is about 100:1 (ester:acid) to about 1:100 (ester:acid).

10. The composition of claim 1, wherein said reaction product has a pH of at least about 1 and further wherein said reaction product has a pH of no more than about 10.

11. The composition of claim 10, wherein said reaction mixture is catalyzed, with a catalyzing agent selected from the group consisting of sulfuric acid, hydrochloric acid, nitric acid, p-toluene sulfonic acid, organic sulfonic acids, and combinations thereof, and neutralized, with a neutralizing agent selected from the group consisting of potassium hydroxide, ammonium hydroxide, sodium hydroxide, and combinations thereof.

12. The composition of claim 10, crosslinked from a least about 0.01 percent, and crosslinked to no more than about 15 percent, with a crosslinking agent selected from the group consisting of diacids, anhydrides thereof, acid halides thereof, and combinations thereof.

13. The composition of claim 5, wherein a ratio of ester to free acid in said reaction product is about 100:1 (ester:acid) to about 1:100 (ester:acid).

14. The composition of claim 5, wherein said reaction product has a pH of at least about 1 and further wherein said reaction product has a pH of no more than about 10.

15. The composition of claim 14, wherein said reaction mixture is catalyzed, with a catalyzing agent selected from the group consisting of sulfuric acid, hydrochloric acid, nitric acid, p-toluene sulfonic acid, organic sulfonic acids, and combinations thereof, and neutralized, with a neutralizing agent selected from the group consisting of potassium hydroxide, ammonium hydroxide, sodium hydroxide, and combinations thereof.

16. The composition of claim 14, crosslinked from at least about 0.01 percent, and crosslinked to no more than about 15 percent, with a crosslinking agent selected from the group consisting of diacids, anhydrides thereof, acid halides thereof, and combinations thereof.

17. The composition of claim 1 wherein the carboxylic acid component is selected from the group consisting of formic acid, acetic acid, propionic acid, and mixtures thereof.

18. The composition of claim 2 wherein the carboxylic acid component is selected from the group consisting of formic acid, acetic acid, propionic acid, and mixtures thereof.

19. The composition of claim 3 wherein the carboxylic acid component is selected from the group consisting of formic acid, acetic acid, propionic acid, and mixtures thereof.

20. The composition of claim 1 wherein the carboxylic acid component is acetic acid.

21. The composition of claim 2 wherein the carboxylic acid component is acetic acid.

22. The composition of claim 3 wherein the carboxylic acid is acetic acid.

23. A method of lubricating a downhole well comprising:
  (a) contacting a lubricating composition comprising one or more esters obtained as a reaction product of a reaction mixture comprising:
    1. a glycerol component, wherein said glycerol component comprises glycerol, glycerol oligomers, or combinations thereof and further wherein said glycerol oligomers comprise linear chains, branched chains, cyclic chains, or combinations thereof and further wherein said glycerol oligomers have at least 2 repeat glycerol units and further wherein said glycerol oligomers have no more than about 32 repeat glycerol units;
    2. a fatty acid component comprising alkyl groups having at least about 8 carbon atoms and further wherein said alkyl groups have no more than about 32 carbon atoms; and
    3. a carboxylic acid component, wherein said carboxylic acid component has at least one carbon atom per molecule and no more than about 8 carbon atoms per molecule;
  wherein the fatty acid component comprises at least 50 percent by weight of the fatty acid component of oleic acid; wherein the fatty acid component comprises at least 5 percent by weight of the reaction mixture; and no more than about 40% by weight of the reaction mixture; and wherein the carboxylic acid component comprises at least about 0.1% by weight of the reaction mixture and no more than 20% of the reaction mixture with a downhole fluid selected from the group consisting of drilling fluids, completion fluids, drill-in fluids, and combinations thereto to provide a drilling mud; and (b) circulating said drilling mud through the well.

24. The method of claim 23, wherein said lubricating composition further comprises a water-insoluble fluid, wherein said water-insoluble fluid is present in an amount of at least about 0.01 percent by weight of the composition, and further wherein said water-insoluble fluid is present in an amount of no more than about 39 percent by weight of the composition and further wherein said water-insoluble fluid is selected from the group consisting of synthetic fluids, mineral oils, diesel, aliphatic compounds, vegetable oils, glycols, and combinations thereof.

25. The method of claim 23, wherein said reaction mixture is catalyzed, with a catalyzing agent selected from the group consisting of sulfuric acid, hydrochloric acid, nitric acid, p-toluene sulfonic acid, organic sulfonic acids, and combinations thereof, and neutralized, with a neutralizing agent selected from the group consisting of potassium hydroxide, ammonium hydroxide, sodium hydroxide, and combinations hereof.

26. The method of claim 23, wherein said composition is crosslinked from at least about 0.01 percent, and crosslinked to no more than about 15 percent, with a crosslinking agent selected from the group consisting of diacids, anhydrides thereof, acid halides thereof, and combinations thereof.

27. The method of claim 23, wherein said drilling mud comprises at least about 0.1 percent said lubricating composition by volume of said drilling mud and further wherein said drilling mud comprises no more than about 25 percent said lubricating composition by volume of said drilling mud.

28. The method of claim 23, wherein said drilling mud comprises at least about 1 percent said lubricating composition by volume of said drilling mud and further wherein said drilling mud comprises no more than about 10 percent said lubricating composition by volume of said drilling mud.

29. The method of claim 23, wherein said drilling mud comprises at least about 3 percent said lubricating composition by volume of said drilling mud and further wherein said drilling mud comprises no more than about 8 percent said lubricating composition by volume of said drilling mud.

30. The method of claim 23, wherein said glycerol component comprises at least about 25 percent by weight of said reaction mixture, and further wherein said glycerol component comprises no more than about 90 percent by weight of said reaction mixture.

31. The method of claim 23, wherein the ratio of ester to free acid in said reaction product is about 100:1 (ester:acid) to about 1:100 (ester:acid).

32. The method of claim 23 wherein the carboxylic acid component is selected from the group consisting of formic acid, acetic acid, propionic acid, and mixtures thereof.

33. The method of claim 24 the carboxylic acid component is selected from the group consisting of formic acid, acetic acid, propionic acid, and mixtures thereof.

34. The method of claim 25 wherein the carboxylic acid component is selected from the group consisting of formic acid, acetic acid, propionic acid, and mixtures thereof.

35. The method of claim 23 wherein the carboxylic acid component is acetic acid.

36. The method of claim 24 wherein the carboxylic acid component is acetic acid.

37. The method of claim 25 wherein the carboxylic acid component is acetic acid.

38. A lubricating composition comprising one or more esters obtained as a reaction product of a reaction mixture comprising:

(a) a glycerol component, wherein said glycerol component comprises glycerol, glycerol oligomers, or combinations thereof and further wherein said glycerol oligomers comprise linear chains, branched chains, cyclic chains, or combinations thereof and further wherein said glycerol oligomers have at least 2 repeat glycerol units and further wherein said glycerol oligomers have no more than about 32 repeat glycerol units; and (b) a fatty acid component comprising alkyl groups having at least about 8 carbon atoms and further wherein said alkyl groups have no more than about 32 carbon atoms; and (c) a crosslinking agent selected from the group consisting of diacids, anhydrides thereof, acid halides thereof, and combinations thereof; wherein said lubricating composition is crosslinked from at least about 0.01 percent and crosslinked to no more than about 15 percent.

39. The composition of claim 38, further comprising a water-insoluble fluid, wherein said water-insoluble fluid is present in an amount of at least 0.01 percent by weight of the composition, and further wherein said water-insoluble fluid is present in an amount of no more than about 39 percent by weight of the composition, and further wherein said water-insoluble fluid is selected from the group consisting of synthetic fluids, mineral oils, diesel, aliphatic compounds, vegetable oils, glycols, and combinations thereof.

40. The method of claim 38, wherein said reaction mixture is catalyzed, with a catalyzing agent selected from the group consisting of sulfuric acid, hydrochloric acid, nitric acid, p-toluene sulfonic acid, organic sulfonic acids, and combinations thereof, and neutralized, with a neutralizing agent selected from the group consisting of potassium hydroxide, ammonium hydroxide, sodium hydroxide, and combinations thereof.

41. A method of lubricating a downhole well comprising:

(a) contacting a lubricating composition comprising one or more esters obtained as a reaction product of a reaction mixture comprising:

(1) a glycerol component, wherein said glycerol component comprises glycerol, glycerol oligomers, or combinations thereof and further wherein said glycerol oligomers comprise linear chains, branched chains, cyclic chains, or combinations thereof and further wherein said glycerol oligomers have at least 2 repeat glycerol units and further wherein said glycerol oligomers have no more than about 32 repeat glycerol units;

(2) a fatty acid component comprising alkyl groups having at least about 8 carbon atoms and further wherein said alkyl groups have no more than about 32 carbon atoms; and (3) a crosslinking agent selected from the group consisting of diacids, anhydrides thereof, acid halides thereof; and combinations thereof; wherein said lubricating composition is crosslinked from at least about 0.01 percent and crosslinked to no more than about 15 percent;

with a downhole fluid selected from the group consisting of drilling fluids, completion fluids, drill-in fluids, and combinations thereof to provide a drilling mud; and (b) circulating said drilling mud through the well.

42. The method of claim 41, wherein said lubricating composition further comprises a water-insoluble fluid, wherein said water-insoluble fluid is present in an amount of at least about 0.01 percent by weight of the composition, and further wherein said water-insoluble fluid is present in an amount of no more than about 39 percent by weight of the composition and further wherein said water-insoluble fluid is selected from the group consisting of synthetic fluids, mineral oils, diesel, aliphatic compounds, vegetable oils, glycols, and combinations thereof.

43. The method of claim 41, wherein said reaction mixture is catalyzed, with a catalyzing agent selected from the group consisting of sulfuric acid, hydrochloric acid, nitric acid, p-toluene sulfonic acid, organic sulfonic acids, and combinations thereof and neutralized, with a neutralizing agent selected from the group consisting of potassium hydroxide, ammonium hydroxide, sodium hydroxide, and combinations thereof.

44. The method of claim 41, wherein said drilling mud comprises at least about 0.1 percent said lubricating composition by volume of said drilling mud and further wherein said drilling mud comprises no more than about 25 percent said lubricating composition by volume of said drilling mud.

* * * * *